United States Patent [19]

Domes et al.

[11] 4,323,279
[45] Apr. 6, 1982

[54] AUTOMATIC TAILGATE FOR A DUMP TRUCK

[75] Inventors: E. A. Domes, Carpentersville; Forrest C. Taylor, Northlake; Dusan M. Vacval, Buffalo Grove; Lawrence A. Venere, Wood Dale, all of Ill.

[73] Assignee: International Harvester Company, Chicago, Ill.

[21] Appl. No.: 146,976

[22] Filed: May 5, 1980

[51] Int. Cl.³ .............................................. B60P 1/26
[52] U.S. Cl. ................................. 298/23 DF; 296/56; 296/184
[58] Field of Search ............... 298/6, 7, 8 R, 8 T, 298/23 R, 23 D, 23 DF, 23 MD, 23 S, 23 C; 296/56, 184; 105/261 A; 414/472, 493, 519, 520, 521

[56] References Cited
U.S. PATENT DOCUMENTS

| 1,425,821 | 8/1922 | Anthony | 298/8 R |
| 1,940,025 | 12/1933 | Silva | 298/6 X |
| 2,454,101 | 11/1948 | Snead | 298/8 R X |
| 2,615,753 | 10/1952 | Shipe | 298/23 D |
| 3,751,112 | 8/1973 | Hagenbuch | 298/23 DF |
| 3,904,049 | 9/1975 | Prahst | 296/56 X |
| 4,194,787 | 3/1980 | Williamsen | 105/261 A X |

FOREIGN PATENT DOCUMENTS 1047716  11/1966  United Kingdom .......... 298/23 DF

Primary Examiner—Leslie J. Paperner
Attorney, Agent, or Firm—F. David Au Buchon

[57] ABSTRACT

A dump truck is provided with a tailgate pivotably mounted to the exterior of the dump body. The tailgate fits into the body between the body sidewalls at a position inboard of the extreme end of the body. The tailgate pivots up and away from the body when the body is hoisted to a dumping mode.

4 Claims, 8 Drawing Figures

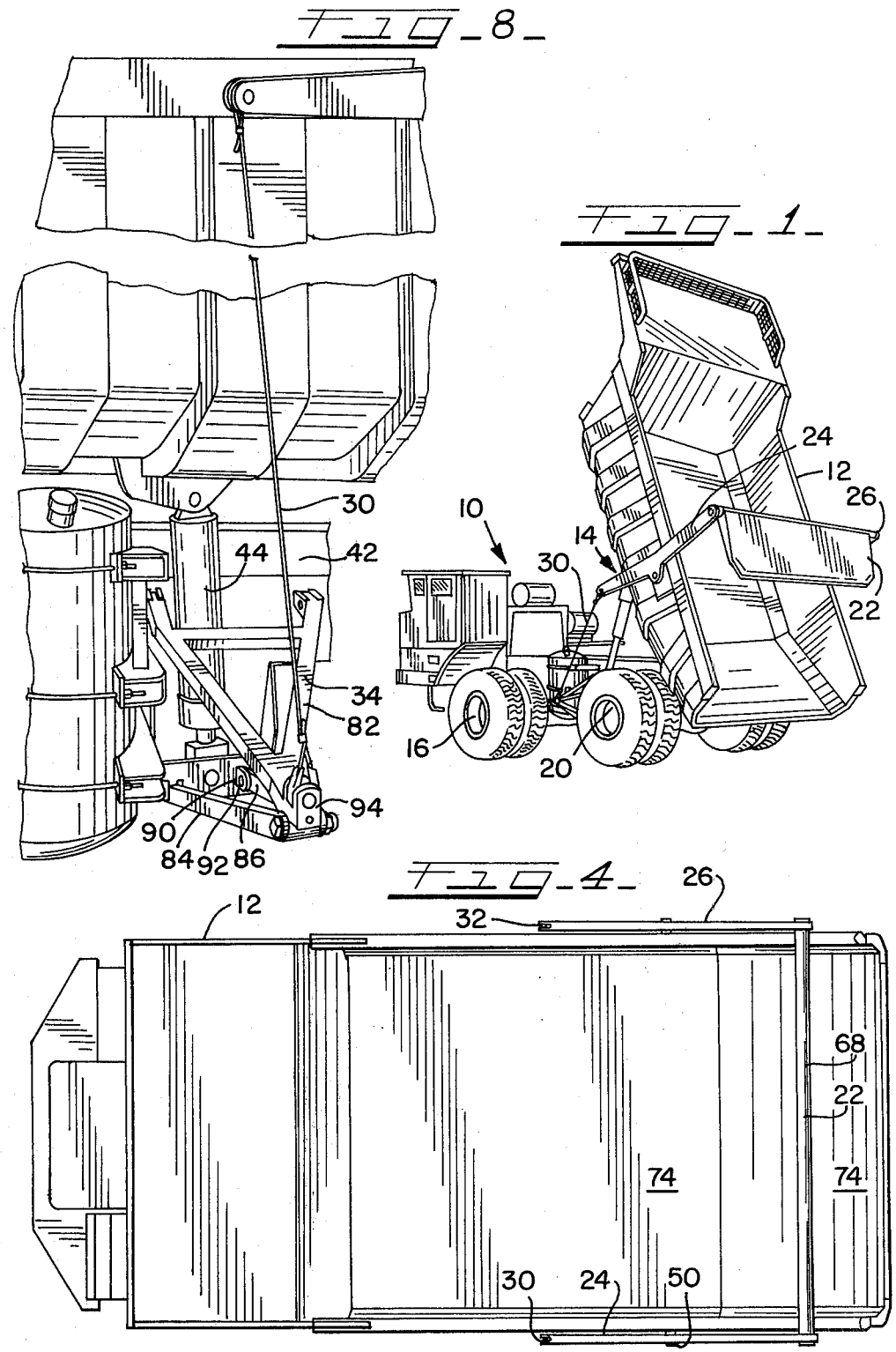

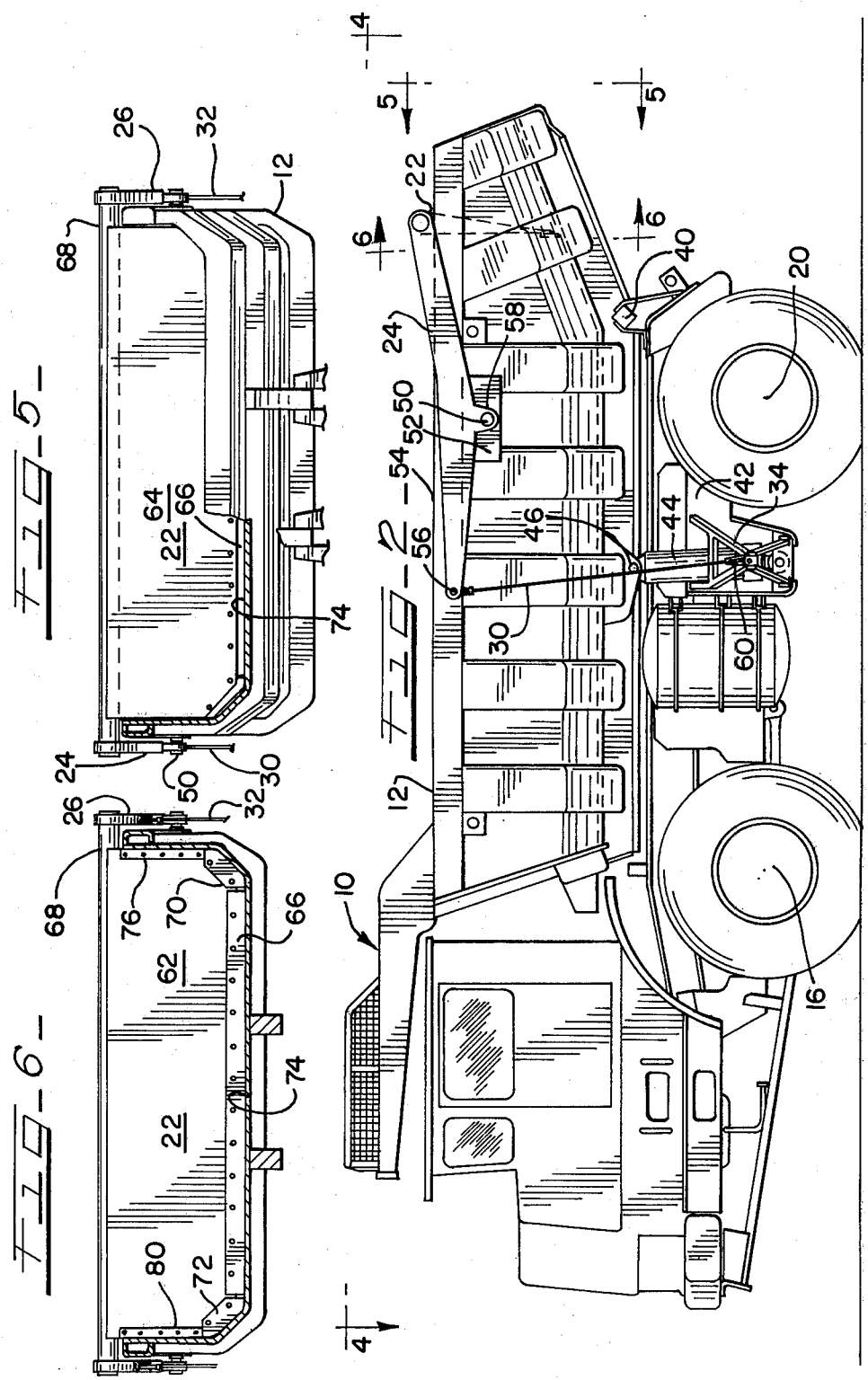

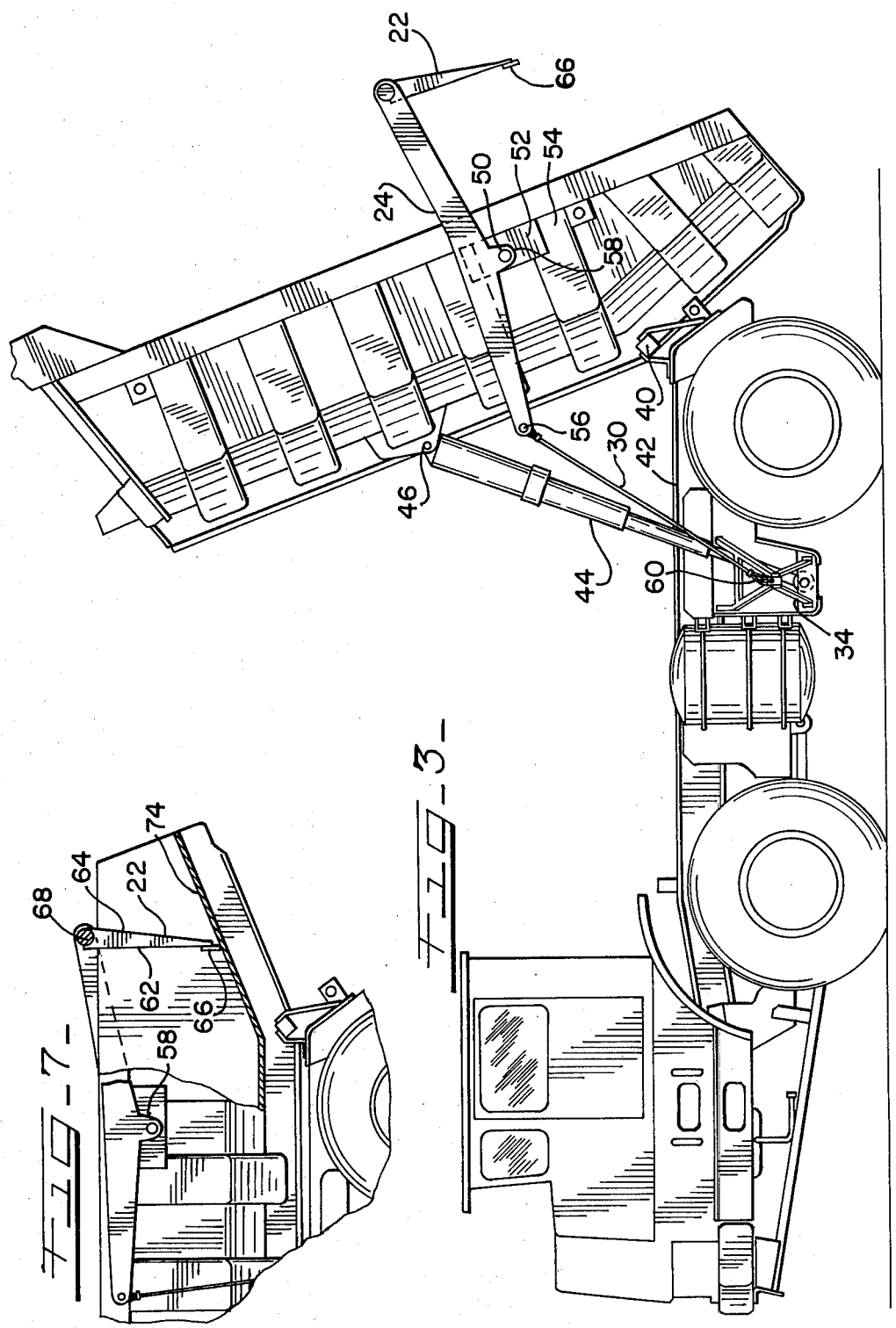

AUTOMATIC TAILGATE FOR A DUMP TRUCK

BACKGROUND OF THE INVENTION

This invention concerns off highway dump trucks of the type having rear dumping bodies. More specifically, the invention deals with automatic tailgates that pivot around a pivot point on the dump body when the body is hoisted to a dumping mode.

Prior art automatic tailgates are well known in the industry. Automatic tailgates have been in use since the advent of horse drawn dumping bodies. Even with this extensive prior art, no automatic tailgates are known that have the advantages and features of the instant tailgate.

It is old in the art to close off the extreme end of a dump body with a tailgate. The tailgate prevents the spilling of the load and allows for better utilization of the capacity of the truck load carrying body. Avoiding spillage on a haul road is important as this minimizes the maintenance of the haul road and may prevent undesirable damage to the rubber tires of most dump trucks. Clean roads also allow higher speeds and the attendant higher productivity.

Automatic tailgates that swing up and away from the open end of a dump body typically operate automatically as the dump body is pivoted to dump. This allows the operator to stay in the cab when dumping. Also, since the tailgate swings relatively upwardly the tailgate is clear of the material being dumped. It won't prevent the material from being discharged and will not become jammed with the material as may happen with a tailgate that is hinged at the end of the body.

This embodiment of automatic tailgate has all the features and advantages mentioned above as well as several items that make this invention an advance over the prior art.

One advantage of this invention is that it prevents an unbalanced distribution of the load being carried in the body. A dump truck is designed to have a specified weight distribution when fully loaded. For instance, in the embodiment shown the ideal loaded weight distribution is to have fifty percent of the load over the front wheels and fifty percent over the back wheels. Since most dump trucks of this type are not designed to have tailgates, the body design will yield this fifty-fifty proportion. If a tail-gate is fitted to the end of the body however, the load center will not only move vertically, but will also move horizontally toward the rear of the body and thus grossly affect the weight distribution. This unbalanced and undesigned for condition leads to abnormal stress and strain on the rear axle and components thus increasing the wear factor and the chance of failure. With the instant invention, the tailgate proper is located inboard of the extreme end of the body by a distance of several feet. The actual location is a predetermined location found so that as the load is increased due to the extra height given to the end of the body by the tailgate, the load center remains vertically above the optimum load center of the original design. Thus, the originally preferred fifty-fifty weight distribution between axles can be maintained.

Notice that in the preferred embodiment a fifty-fifty load distribution is considered optimum. Other embodiments where other proportions are desired, such as 40–60, would also benefit from this invention. The idea is to maintain the optimum load center on the same vertical center line corresponding to the original design.

Another advantage of this invention is that since the tailgate is carried inboard of the extreme end of the body, any spillage caused by jostling while traveling on the haul road will fall over the tailgate into the pan at the back section of the body. This will minimize the deterioration of the haul road due to extraneous material and will reduce grading frequency and tire damage.

Also an advantage of this invention is that since the tailgate fits inside the body, the spreading of the body when loaded will not prevent the tailgate from swinging into position inside the body. In one prior art device, the tailgate is designed to telescope within itself to accommodate the spreading body sides. This costly and bothersome modification isn't necessary with the instant tailgate.

A further advantage of this invention is that since the tailgate fits into the body, it can be equipped with a cutting edge that will slice through any residual dirt or mud that has stuck in the body thus allowing good sealing between the lower edge of the tailgate and the body floor. The effectiveness of this cutting edge can be improved by using a solid link to actuate the tailgate support arm in place of a preferred flexible cable. The solid linkage will force the cutting edge to the floor of the body.

An object of this invention is to provide a tailgate that can be fitted to a current production dump truck without modifying the basic equipment of the truck. The automatic tailgate should also be easy to manufacture and install, as this tailgate is.

Another object of this invention is to provide an automatic tailgate that can be easily removed when it is not needed or when servicing of the vehicle requires access to areas behind the tailgate apparatus.

Also an object of this invention is to provide a modification to a dump truck that enables the truck to be used in hauling slurry material without the material sloshing out the back of the body.

SUMMARY OF THE INVENTION

An off-the-road dump truck is provided with an automatic tailgate mounted to the sidewalls of a dump body of the truck. The automatic tailgate is a generally one piece panel extending the width of the dump body and fixed in a non-pivotable relationship to a pair of pivotable arms. Each arm is carried on one side of the dump body and is attached at one end thereof to an anchor cable extending from each pivotable arm to an outrigger connected to the dump truck's frame. As the dump body is hoisted into a dumping position, the anchor cable maintains the pivotable arm in a relatively horizontal position, thereby swinging the tailgate around the pivot point mounting location on the dump body. The tailgate swings sufficiently far to enable the load in the dump body to be dumped.

When the dump body is lowered, the tailgate fits inside the dump body several feet inboard of the extreme end of the dump body. The tailgate enables the load carrying capacity of the vehicle to be increased while maintaining the designed in weight distribution between front and rear axles of the vehicle.

BRIEF DESCRIPTION OF THE DRAWING FIGURES

The objects and advantages of this invention can be appreciated through an understanding of the following specification when read in light of the drawing figures wherein:

FIG. 1 presents a projected figure of a dump truck embodiment wherein the dump body has been hoisted to a dumping mode;

FIG. 2 is a side elevation of a dump truck incorporating the automatic tailgate of this invention;

FIG. 3 is an elevation view of the dump truck of FIG. 2 in a dumping mode;

FIG. 4 is a top view of the dump truck shown in FIG. 2;

FIG. 5 is a rear elevation view of the dump body portion of the dump truck of FIG. 2;

FIG. 6 is a front elevation view of the tailgate in the dump body of FIG. 6 taken through plane 6—6 of FIG. 2; and FIG. 7 is an elevation view of a portion of a dump truck having a portion of a sidewall broken away to show the tailgate in position in the dump body;

FIG. 8 is a view of an anchor cable outrigger.

DETAILED DESCRIPTION OF THE INVENTION

FIG. 1 presents a good overall view of the invention. Shown is an off-the-road dump truck generally 10 having a large dump body, hereinafter body 12, to which an automatic tailgate generally 14 is pivotally mounted. The dump truck of this embodiment is a two axle truck in which the front wheels and the rear wheels are all driven. As this is a four wheel (8 tire) drive machine, optimum load distribution is approximately fifty-fifty between front 16 and rear 20 axles.

The automatic tailgate is comprised of the tailgate proper 22, hereinafter just the tailgate; a left side support arm 24, a right side support arm 26, left and right side anchor cables 30 and 32 and left and right side anchor cable outriggers 34 and 36. (Items 32 and 36 are not visible in FIG. 1).

FIGS. 2 and 3 show the embodiment of the invention in greater detail. The dump truck generally 10 is supported on front 16 and rear 20 axles. The body 12 is pivotably mounted at point 40 and is supported on a frame 42. The body will be hoisted to a dumping mode as shown in FIG. 3 by a pair of hydraulic hoisting cylinders one shown as 44, which are mounted to the frame 42 and to the bottom of the body 12 at mounting point 46.

The left side support arm 24 is pivotally carried by an attachment fitting between first and second ends of the support arm. A pivot pin 50 is accommodated in the attachment fitting. The pin is fixedly mounted to a plate 52 welded to the left body side 54 of the body 12, an identical arrangement is used on the unseen right side of the body.

The left side anchor cable 30 is connected at attachment point 56 at one end thereof of the left side support arm 24. The anchor cable 30 is attached at its first end 60 to the left side anchor cable outrigger 34. Right side cable and outrigger are similar.

The preferred embodiment shown utilizes a cable between the pivotable arm and the outrigger, however it is contemplated that a second embodiment would be possible wherein the cable would be replaced with a solid link. The solid link would operate identical to the flexible cable in pivoting the tailgate when the body is being dumped. After the body is dumped and upon lowering of the body the solid links would facilitate the closing of the tailgate and as the tailgate approached the bed of the body, the solid link would force the tailgate through any accumulated dirt or mud left caked in the body. Of course, the solid link length would be adjusted so that its length would just allow the tailgate to contact the bed without enough force to damage the bed.

FIG. 3 shows the dump body pivoted into a dumping mode. The tailgate 22 has been effectively lifted away from the interior of the body to allow the load to be dumped. Pivot pin 50 on the body 12 has swung through an arc around the body pivot point 40. Correspondingly, cable attachment point 56 has also arcuately swung toward the rear of the body.

The tailgate 22 can best be seen in FIGS. 4, 5, 6 and 7. FIG. 5 shows the tailgate 22 in elevation from the rear of the body 12. Left side anchor cable 30, left side support arm 24, pivot pin 50 are shown as are right side anchor cable 32 and right side support arm 26. The tailgate is assembled from a tube, bar or transverse beam 68 to which front 62 and rear 64 plates are fastened. The tailgate is carried at the second ends of the left and right support arms. A cutting edge 66 may be fastened to the lower edges of the front and rear plates 62 and 64. Transitional cutting edges such as 70 and 72 may also be fastened to the plates in order that the tailgate can conform to the profile of the floor or bed 74. Sealing strips 76 and 80 of a deformable material may also be fastened to the tailgate plates to provide a good seal between the bed and the tailgate.

In an alternative embodiment transatory cutting edges 70 and 72 could also be deformable rather than nondeformable cutting edges. This may allow better sealing as well as an increased tolerance for misalignment between the tailgate and the body bed.

FIG. 2 shows details of the left side anchor cable outrigger. A right side anchor cable outrigger is similar to the left one. An upper wishbone link 82 and a pair of lower links 84 and 86 are mounted to the frame 42 through pinned connectors such as 90. Each pinned connector includes a pair of upstanding tabs provided with aligned holes for accepting an attaching pin 92. Each lower link and each leg of the upper wishbone link is provided with a corresponding hole through which the pin 92 passes after the respective links are positioned between the tabs of the four pinned connectors 90. Typically, the pins 92 would have a head at one end larger than the holes and a cotter pin receiving aperture at the other end to receive a restraining cotter pin (not clearly shown).

The outriggers can be easily removed by removing the pin. This produces access to equipment such as the hydraulic hoisting cylinder 44. Furthermore, if the tailgate is not needed the outriggers can be removed, but would be easily replaced subsequently.

The outboard end of the upper wishbone link is provided with an attachment point 94 that allows the cable 30 to rotate as the body moves to a dumping position.

In FIG. 7 as well as FIGS. 2 and 4, it should be noted that the tailgate 22 is located inboard of the extreme end of the body 12. Typically, this distance may be a distance of several feet. By positioning the tailgate at this location rather than at the extreme end of the body, the increased load carrying capacity of the vehicle due to the tailgate will not cause a detrimental shift rearward of the load center of the loaded dump body. With proper design, it would be possible to significantly increase the load carrying capacity of the dump truck without effecting the weight distribution between axles 16 and 20. Thus, if a dump truck such as that shown in FIG. 2 would have a fifty-fifty weight distribution when loaded without the utilization of the tailgate, then the optimum loading of the vehicle after the tailgate has been installed would also be fifty-fifty between the front and rear axles. By locating the tailgate inboard between the sidewalls of the dump body this desirable weight distribution can be maintained.

Thus it has been shown that there is provided an automatic tailgate fulfilling the objects and advantages of this invention. A specific embodiment of the invention has been shown and several other embodiments have been mentioned in the specifications. The following claims have been drafted to be representative of the scope of the invention set forth in the specification given a fair reading of what is set forth. Minor modifications to the structure as set forth herein are contemplated by the inventor and such minor modifications such as the substitution of a chain for the cable identified as 30 are sought to be covered by the following claims.

What is claimed is:

1. In an off highway dump truck having a frame supported on a front and a rear axle, a dump body pivotally supported on said frame, said body having left and right sidewalls, a floor and an open end, said body capable of being pivoted from a transport mode to a dumping mode, an automatic tailgate comprising:
   a pair of anchor cable outriggers attached to said frame, one of said pair of anchor cable outriggers located on the left side of said dump truck and a second of said pair of anchor cable outriggers located on the right side of said dump truck;
   a pair of anchor cables, one of each of said pair attached to one of each of said anchor cable outriggers;
   a left side support arm having a cable attachment point at one end thereof, a second end, and an attachment fitting between said first and second ends to which one of said anchor cables is attached;
   a first pivot pin intergral with a plate attached to the exterior of said left sidewall of said dump body, said left side support arm pivotally supported through said attachment fitting to said first pivot pin;
   a right side support arm having a cable attachment point at one end thereof, a second end and an attachment fitting between said first and second ends to which a second of said pair of anchor cables is attached;
   a second pivot pin integral with a plate attached to the exterior of said right sidewall of said dump body, said right side support arm pivotally supported through said attachment fitting to said second pivot pin;
   a tailgate carried by said left and right side support arms at said second ends thereof, said tailgate having a transverse beam affixed at each end thereof to said left and right support arms respectively, a plate fastened to said transverse beam and having a bottom edge and side edges, said side edges significantly inboard of said ends of said transverse beam, whereby said tailgate projects into said body inboard of said sidewalls.

2. In an off highway dump truck having a frame supported on a front and a rear axle, a dump body pivotally supported on said frame, said body having side walls, a floor and an open end, said body capable of being pivoted from a transport mode to a dumping mode, an automatic tailgate comprising:
   a pair of anchor cable outriggers attached to said frame, one of said pair of anchor cable outriggers located on the left side of said dump truck and a second of said pair of anchor cable outriggers located on the right side of said dump truck;
   a pair of anchor cables, one of each of said pair attached to one of each of said anchor cable outriggers;
   a left side support arm having a cable attachment point at one end thereof, a second end, and an attachment fitting between said first and second ends to which one of said anchor cables is attached;
   a first pivot pin integral with a plate attached to a side wall of said dump body, said left side support arm pivotally supported through said attachment fitting to said first pivot pin;
   a right side support arm having a cable attachment point at one end thereof, a second end and an attachment fitting between said first and second ends to which a second of said pair of anchor cables is attached;
   a second pivot pin integral with a plate attached to a side wall of said dump body, said right side support arm pivotally supported to said attachment fitting to said second pivot pin;
   a tailgate carried by said left and right side support arms at said second ends thereof, said tailgate projecting into said body inboard of said side walls inboard of said open end of said body, wherein said anchor cable outriggers each comprise:
   an upper wishbone link having an attachment point at an outboard end thereof and horizontal holes through the inboard ends of said wishbone link;
   a pair of lower links having outboard ends attached to the outboard end of said upper wishbone link and holes through inboard ends of each lower link;
   a plurality of pinned connectors fastened to said frame for accommodating inboard ends of each link of said anchor cable outrigger, each pinned connector having a removable pin passing through said connector and through respective holes of said links for attaching said anchor cable outrigger to said frame in a removable manner.

3. An anchor cable outrigger attached to the frame of a dump truck for providing an attachment point for attaching an anchor cable for use in operating a tailgate, said anchor cable outrigger comprising:
   an upper wishbone link having an attachment point at an outboard end thereof and horizontal holes through the inboard ends of said wishbone link;
   a pair of lower links having outboard ends attached to the outboard end of said upper wishbone link and holes through inboard ends of each lower link;
   a plurality of pinned connectors fastened to said frame for accommodating inboard ends of each link of said anchor cable outrigger, each pinned connector having a removable pin passing through said connector and through respective holes of said links for attaching said anchor cable outrigger to said frame in a removable manner.

4. In an off highway dump truck having a frame supported on a front and a rear axle, a dump body pivotally supported on said frame and a multiple cable operated tailgate projecting into said dump body, one of each of said cables attached to a pair of anchor cable outriggers attached to said frame, one of said pair of anchor cable outriggers located on the left side of said dump truck and the second of said pair of anchor cable outriggers located on the right side of said dump truck, wherein said anchor cable outriggers each comprise:

an upper wishbone link having an attachment point at an outboard end thereof and horizontal holes through the inboard ends of said wishbone link;

a pair of lower links having outboard ends attached to the outboard end of said upper wishbone link and holes through inboard ends of each lower link;

a plurality of pinned connectors fastened to said frame for accommodating inboard ends of each link of said anchor cable outrigger, each pinned connector having a removable pin passing through said connector and through respective holes of said links for attaching said anchor cable outrigger to said frame in a removable manner.

* * * * *